US009542658B2

(12) United States Patent
Grossman et al.

(10) Patent No.: US 9,542,658 B2
(45) Date of Patent: Jan. 10, 2017

(54) SYSTEM AND METHOD FOR IDENTIFYING POWER USAGE ISSUES

(75) Inventors: Gary Grossman, San Francisco, CA (US); Robert Tatsumi, San Francisco, CA (US); Peter Santangeli, Los Gatos, CA (US); Jonathan Gay, Mill Valley, CA (US); Matthew Smith, San Francisco, CA (US)

(73) Assignee: Silver Spring Networks, Inc., San Jose, CA (US)

(*) Notice: Subject to any disclaimer, the term of this patent is extended or adjusted under 35 U.S.C. 154(b) by 1686 days.

(21) Appl. No.: 12/590,451

(22) Filed: Nov. 6, 2009

(65) Prior Publication Data

US 2010/0110077 A1    May 6, 2010

Related U.S. Application Data

(60) Provisional application No. 61/198,680, filed on Nov. 6, 2008.

(51) Int. Cl.
*G06T 11/20* (2006.01)
*G06Q 10/06* (2012.01)
*G06Q 50/06* (2012.01)

(52) U.S. Cl.
CPC .............. *G06Q 10/06* (2013.01); *G06Q 50/06* (2013.01); *G06T 11/206* (2013.01)

(58) Field of Classification Search
CPC ...................................................... G06Q 10/06
USPC ........................................................ 345/440
See application file for complete search history.

(56) References Cited

U.S. PATENT DOCUMENTS

| | | | |
|---|---|---|---|
| 4,254,472 A * | 3/1981 | Juengel et al. | 702/188 |
| 4,350,980 A | 9/1982 | Ward | |
| 4,401,943 A | 8/1983 | Morris | |
| 4,644,320 A * | 2/1987 | Carr et al. | 340/12.37 |
| 4,808,841 A | 2/1989 | Ito et al. | |
| 4,855,922 A | 8/1989 | Huddleston et al. | |
| 5,086,385 A * | 2/1992 | Launey et al. | 700/83 |
| 5,287,287 A | 2/1994 | Chamberlain et al. | |
| 5,424,587 A | 6/1995 | Federowicz | |
| 5,485,393 A * | 1/1996 | Bradford | 702/60 |
| 5,517,423 A * | 5/1996 | Pomatto | 700/286 |
| 5,565,855 A * | 10/1996 | Knibbe | 340/3.51 |
| 5,576,700 A | 11/1996 | Davis et al. | |
| 5,605,771 A | 2/1997 | Eidler et al. | |
| 5,631,843 A * | 5/1997 | Munday et al. | 700/286 |
| 5,635,895 A | 6/1997 | Murr | |

(Continued)

FOREIGN PATENT DOCUMENTS

| | | |
|---|---|---|
| WO | 99/45445 | 9/1999 |
| WO | 99/57646 | 11/1999 |

(Continued)

OTHER PUBLICATIONS

PCT/US2009/005996 International Search Report and Written Opinion dated Jun. 23, 2010 (6 pages).

(Continued)

*Primary Examiner* — Javid A Amini
(74) *Attorney, Agent, or Firm* — Artegis Law Group, LLP

(57) ABSTRACT

A system and method analyzes resource consumption without requiring sensors at every device for which consumption is analyzed. Data rates used to provide resource use information may be increased or decreased based on user actions.

21 Claims, 6 Drawing Sheets

(56) References Cited

U.S. PATENT DOCUMENTS

| | | | |
|---|---|---|---|
| 5,699,276 A * | 12/1997 | Roos | 379/106.03 |
| 5,854,994 A * | 12/1998 | Canada et al. | 702/56 |
| 5,897,607 A * | 4/1999 | Jenney et al. | 702/62 |
| 6,018,726 A * | 1/2000 | Tsumura | 705/412 |
| 6,052,671 A * | 4/2000 | Crooks et al. | 705/34 |
| 6,088,688 A * | 7/2000 | Crooks et al. | 705/412 |
| 6,226,600 B1 | 5/2001 | Rodenberg, III et al. | |
| 6,366,889 B1 | 4/2002 | Zaloom | |
| 6,552,525 B2 | 4/2003 | Bessler | |
| 6,633,823 B2 | 10/2003 | Bartone et al. | |
| 6,785,620 B2 | 8/2004 | Kishlock et al. | |
| 6,816,360 B2 | 11/2004 | Brooksby et al. | |
| 6,906,617 B1 | 6/2005 | Van der Meulen | |
| 6,934,862 B2 | 8/2005 | Sharood et al. | |
| 6,956,500 B1 | 10/2005 | Ducharme et al. | |
| 6,999,567 B2 | 2/2006 | Crichlow | |
| 7,010,363 B2 | 3/2006 | Donnelly et al. | |
| 7,043,380 B2 | 5/2006 | Rodenberg, III et al. | |
| 7,062,361 B1 | 6/2006 | Lane | |
| 7,064,679 B2 | 6/2006 | Ehrke et al. | |
| 7,068,184 B2 | 6/2006 | Yee et al. | |
| 7,089,089 B2 | 8/2006 | Cumming et al. | |
| 7,116,243 B2 | 10/2006 | Schleich et al. | |
| 7,130,719 B2 | 10/2006 | Ehlers et al. | |
| 7,135,956 B2 | 11/2006 | Bartone et al. | |
| 7,155,912 B2 | 1/2007 | Enis et al. | |
| 7,177,728 B2 | 2/2007 | Gardner | |
| 7,184,904 B2 | 2/2007 | Kagan | |
| 7,185,131 B2 | 2/2007 | Leach | |
| 7,188,003 B2 | 3/2007 | Ransom et al. | |
| 7,196,673 B2 | 3/2007 | Savage et al. | |
| 7,216,021 B2 | 5/2007 | Matsubara et al. | |
| 7,230,972 B2 | 6/2007 | Cornwall et al. | |
| 7,246,014 B2 | 7/2007 | Forth et al. | |
| 7,263,450 B2 | 8/2007 | Hunter | |
| 7,289,887 B2 | 10/2007 | Rodgers | |
| 7,317,404 B2 | 1/2008 | Cumeralto et al. | |
| 7,373,222 B1 * | 5/2008 | Wright et al. | 700/295 |
| 7,541,941 B2 | 6/2009 | Bogolea et al. | |
| 2001/0010032 A1 | 7/2001 | Ehlers et al. | |
| 2002/0087234 A1 * | 7/2002 | Lof et al. | 700/286 |
| 2002/0178047 A1 * | 11/2002 | Or et al. | 705/10 |
| 2003/0009265 A1 | 1/2003 | Edwin | |
| 2003/0036820 A1 | 2/2003 | Yellepeddy et al. | |
| 2003/0063723 A1 * | 4/2003 | Booth et al. | 379/106.03 |
| 2003/0176952 A1 | 9/2003 | Collins et al. | |
| 2004/0128266 A1 | 7/2004 | Yellepeddy et al. | |
| 2004/0239522 A1 | 12/2004 | Gallagher | |
| 2004/0267408 A1 | 12/2004 | Kramer | |
| 2005/0043862 A1 | 2/2005 | Brickfield et al. | |
| 2005/0055432 A1 | 3/2005 | Rodgers | |
| 2005/0086341 A1 | 4/2005 | Enga et al. | |
| 2005/0116814 A1 | 6/2005 | Rodgers et al. | |
| 2005/0116836 A1 | 6/2005 | Perry et al. | |
| 2005/0131583 A1 * | 6/2005 | Ransom | 700/295 |
| 2005/0190074 A1 * | 9/2005 | Cumeralto et al. | 340/870.02 |
| 2006/0015355 A1 * | 1/2006 | Wolkoff et al. | 705/1 |
| 2006/0276938 A1 * | 12/2006 | Miller | 700/295 |
| 2007/0124026 A1 * | 5/2007 | Troxell et al. | 700/291 |
| 2007/0239317 A1 | 10/2007 | Bogolea et al. | |
| 2007/0247331 A1 * | 10/2007 | Angelis et al. | 340/870.02 |
| 2010/0110077 A1 * | 5/2010 | Grossman et al. | 345/440 |

FOREIGN PATENT DOCUMENTS

| | | |
|---|---|---|
| WO | 01/06432 | 1/2001 |
| WO | 01/15099 | 3/2001 |
| WO | 02/27334 | 4/2002 |
| WO | 02/084309 | 10/2002 |
| WO | 03/030509 | 4/2003 |
| WO | 03/084022 | 10/2003 |
| WO | 2004/114496 | 12/2004 |
| WO | 2005/029243 | 3/2005 |
| WO | 2006/017094 | 2/2006 |
| WO | 2006/119185 | 11/2006 |
| WO | 2007/030470 | 3/2007 |

OTHER PUBLICATIONS

PCT/US07/65990 International Search Report dated Jul. 7, 2008 (4 pages).

PCT/US07/74516 International Search Report dated Jul. 30, 2008 (2 pages).

NURI Telecom, Ember, Wireless Semiconductor Solutions, Wireless Energy Meters Improve Efficiency and Save Money: NURI Telecom and Ember Automate Meter Reading, available online at: <http://www.ember.com/pdf/NURI_Telecom_06Jun2005.pdf>, Jun. 6, 2005.

Wikipedia, Home Automation, available online at: <http://en.wikipedia.org/wiki/Home_automation>, at least as early as Apr. 4, 2007.

Hyland, Dave, comverge, Role of Thermostats in Demand Response, available online at: <http://www.peaklma.com/New%20Folder/documents/Hyland.pdf>, Nov. 9, 2006.

Millennial Net, Wireless Sensor Networking and Energy Management Solutions, available online at: <http://www.millennial.net/>, at least as early as Apr. 4, 2007.

ZigBee Alliance, Home, available online at: <http://www.zigbee.org/>, at least as early as Apr. 4, 2007.

King, Ben, "Home Automation Players Lock Horns and Garage Doors, Fridges, Windows", The Register, available online at: <http://www.theregister.co.uk/2005/06/16/home_auto_launch/>, Jun. 16, 2005.

B&B Electronics, Wireless Case Studies, U.S. Department of Energy Chimes in on Improving Motor Efficiencies via 802.15.4 Wireless Sensors, available online at: <http://www.bb-elec.com/wireless-case-study-dept-of-energy.asp>, at least as early as Apr. 4, 2007.

ZigBee, News Release, "New ZigBee-Based Wireless Energy Meters Aim to Save Public Utilities Millions of Dollars", available online at: <http://www.automatedbuildings.com/releases/mar05/nuri.htm>, Mar. 2005.

RFDesign, "ZigBee-Based Wireless Energy Meters Enter U.S. Market", available online at: <http://rfdesign.com/news/Zigbee-energy-meters/>, Mar. 3, 2005.

Office Action from the U.S. Patent Office for U.S. Appl. No. 11/878,711 dated Jun. 16, 2008 (9 pages).

Notice of Allowance from the U.S. Patent Office for U.S. Appl. No. 11/878,711 dated Feb. 6, 2009 (6 pages).

Advisory Action Before the Filing of an Appeal Brief from the U.S. Patent Office for U.S. Appl. No. 11/696,669 dated Jun. 10, 2009 (3 pages).

Examiner's Answer from the U.S. Patent Office for U.S. Appl. No. 11/696,669 dated Mar. 30, 2010 (25 pages).

Office Action from the U.S. Patent Office for U.S. Appl. No. 11/696,669 dated Mar. 23, 2009 (18 pages).

Office Action from the U.S. Patent Office for U.S. Appl. No. 11/696,669 dated Jun. 26, 2008 (13 pages).

Laughman,Christopher; Lee, Douglas; Cox, Robert; Shaw, Steven; Leeb, Steven; Norford, Les; Armstrong, Peter; "Advanced Nonintrusive Monitoring of Electric Loads", High Performance Commercial Building Systems, IEEE Power and Energy Magazine, Mar./Apr. 2003, p. 56-63, IEEE, New York, New York, USA: http://eetd.lbl.gov/BT/hpcbs/pubs/E5P22T3d.pdf.

L.K. Norford, S.B. Leeb, D. Luo and S.R. Shaw, "Advanced Electrical Loading Monitoring: A Wealth of Information at Low Cost", Lawrence Berkley National Laboratories, Berkeley, CA, USA: http://poet.lbl.gov/diagworkshop/proceedings/norford.htm.

"Nonintrusive load monitoring", Wikipedia, San Francisco, CA, USA: http://en.wikipedia.org/wiki/Nonintrusive_load_monitoring.

http://www.nuritelecom.com/eng/about_us/notice.jsp?seqno=11&comcd=e_news&querytype=1&curpage=1&keytype=11&keyvalue=11, at least as early as Apr. 4, 2007.

(56) References Cited

OTHER PUBLICATIONS

Naiad, Carlos, SCE Programmable Communicating Thermostat (PCT), Demand Response and Energy Efficiency 2006 Emerging Technologies Summit, Long Beach, California, Oct. 26, 2006.
SmartSynch, "Sentinel Smartmeter", 4 pages, at least as early as Apr. 4, 2007.
SmartSynch, SmartSynch, Inc., company information, 2 pages, at least as early as Apr. 4, 2007.
SmartSynch, "Transaction Management System", 4 pages, at least as early as Apr. 4, 2007.
SmartSynch, "Advanced Communication Network", 2 pages, at least as early as Apr. 4, 2007.
SmartSynch, SmartMeter System Overview, pp. 1-12, <http://www.smartsynch.com/products/smartmeter_overview.html>, at least as early as Apr. 4, 2007.
SmartSynch, "SmartMeter Power Quality Matrix", 1 page, at least as early as Apr. 4, 2007.
SmartSynch, "A3 Alpha SmartMeter", 4 pages, at least as early as Apr. 4, 2007.
SmartSynch, "SmartSynch Quick Facts", 1 page, at least as early as Apr. 4, 2007.
SmartSynch, "TMS System Interfaces", 2 pages, at least as early as Apr. 4, 2007.
SmartSynch, Centron Smartmeter, 4 pages, at least as early as Apr. 4, 2007.
Primen Final Report on California Information Display Pilot Technology Assessment, Dec. 21, 2004.

\* cited by examiner

SYSTEM AND METHOD FOR IDENTIFYING POWER USAGE ISSUES

CROSS REFERENCE TO RELATED APPLICATION

This application claims the benefit of U.S. Provisional application Ser. No. 61/198,680, entitled, Method and Apparatus for Identifying Power Usage Issues filed by Gary Grossman, Robert Tatsumi, Peter Santangeli, Jonathan Gay and Matthew Smith on Nov. 6, 2008, having the same assignee as the present application and is hereby incorporated by reference in its entirety.

FIELD OF THE INVENTION

The present invention is related to computer software and more specifically to computer software for residential power analysis.

BACKGROUND OF THE INVENTION

Power analysis systems in residences have not been successful in the marketplace because the systems require sensors on resource consuming devices, like refrigerators, pool pumps and the like. The costs of the sensors and their installation can be so high that homeowners are unwilling to take the risk of purchasing a system that may not save them more than the cost of the system.

As smart power meters are installed between the power grid and homes, this represents an opportunity to install a solution in the power meter that can be used to implement power analysis functions. For example, a meter could be developed that would recognize a power signature of each device in the home. However, this would require a meter that reported the power thousands of times per second, to provide the resolution of the power use that could be used in such a system. Currently available meters do not report this frequently. Although they could be made to increase their reporting rate, this too would increase the cost of the system. Utilities are frequently the party that bears the cost of a retrofit of a meter. Many utilities would not want to pay the extra costs for such a meter. Furthermore, the network capacity for many meters may be limited, and that much data could be problematic.

What is needed is a system and method that can analyze power usage without requiring power sensors on every device, can use the capabilities of existing smart meters, and will not overload the network bandwidth of the smart meters.

SUMMARY OF INVENTION

A system and method uses the capabilities of the smart power meter, any other smart meters, and any devices capable of power monitoring, to receive power monitoring reports at a central server. Weather reports from Internet web sites that supply such reports may also be used. The system and method displays the power usage to the user in near real time, graphically showing the level of power being used at the user's residence or business over time. The system and method incorporates reports of power usage from any devices that monitor their own power usage. For other devices, the user can turn devices on and off, or monitor times devices have turned themselves on or off, and then visually identify the power usage of such devices using the graph displayed, and indicate the name of the device, and the system and method associates the name with the power usage and attempts to identify the power usage over typical multiple times of operation of the device. If the power usage can not be automatically identified, the system and method prompts the user for information to allow its manual identification. Thus, although devices with power sensing capabilities can be used, the power usage of devices without such capability can be analyzed as well. A data structure containing power usage of an anonymous device is thus transformed with the name of the device.

The system and method may then compare the resource usage of a device with that of other similar devices or similar devices in the same geographic area to identify problems or make recommendations regarding the saving of power. Information may be provided to retailers or manufacturers who can market devices that have a lower resource consumption profile than the device the user has, and can make precise cost/benefit comparisons.

DETAILED DESCRIPTION OF A PREFERRED EMBODIMENT

Figure 1:
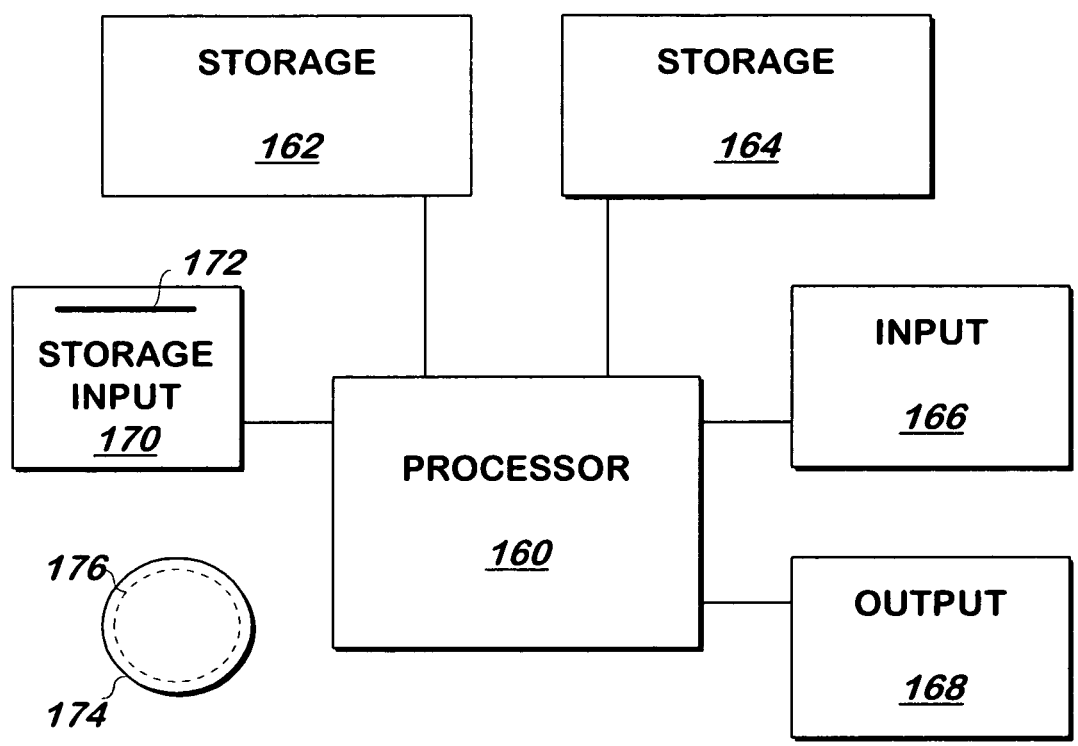
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems such as cell phones, IPHONES commercially available from APPLE, INC. and touch screen photo viewers may be used.

Figure 2:
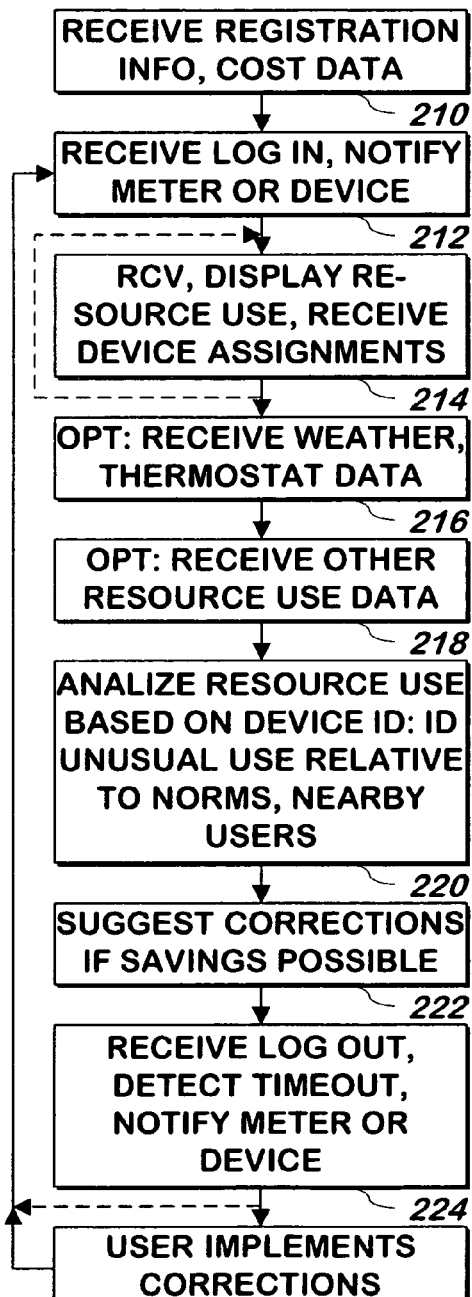
FIG. 2 is a flowchart illustrating a method of analyzing power usage according to one embodiment of the present invention.

Referring now to FIG. 2, a method of analyzing power or other resource consumption is shown according to one embodiment of the present invention.

Registration information is received, for example, from the user, and cost data is received, for example, from a utility 210. In one embodiment the registration information may include a name and address/city/state/zip, utility account number or meter identifier or an identifier of a device that collects resource use information and provides it to a server as described in more detail herein. Registration information may include receipt or assignment of a user identifier and receipt of a password.

The user logs into a server via a computer coupled to a network, such as the Internet 212. In one embodiment, in response, the server notifies the user's power meter using the registration information, and the user's power meter changes from providing data at a second rate, to providing data at a first rate, whereby the first rate is faster than the second rate. For example, the power meter may provide an indication of the rate of power being supplied every 15 minutes at the second rate, and every 5 seconds at the first rate. In one embodiment, such notification and change in rates does not occur until the user indicates that the user wishes to view resource use or provide device assignments as described in more detail herein. Other types of meters may be used instead of, or in addition to, the power meter.

Resource use is received by the server 214. In one embodiment, resources may include power, water, natural gas phone, cable, or other utilities. In one embodiment, the server may receive resource use at other times, but the reports are provided at a slower rate than it is received when the user has logged in as described above. In one embodiment, step 214 includes displaying the resource use to the user, and receiving assignments of devices to portions of the resources being used as described in more detail herein.

Weather information may be received for an area at least near the user's location, for example, from a web site that provides weather by providing the user's zip code, or weather information may be retrieved from a database 216. In one embodiment weather information includes conditions such as sunny, cloudy, rain, etc., wind speeds, and/or outside temperature. Additionally, thermostat information may be received from a thermostat capable of transmitting such information. Thermostat information may include the temperature at the thermostat or at one or more sensors monitored by the thermostat, the trigger temperature or temperatures at which heating or cooling devices, such as a heat pump or furnace, will turn on. The on or off status or resource consumption amount of the device controlled by the thermostat may also be received.

Figure 7:
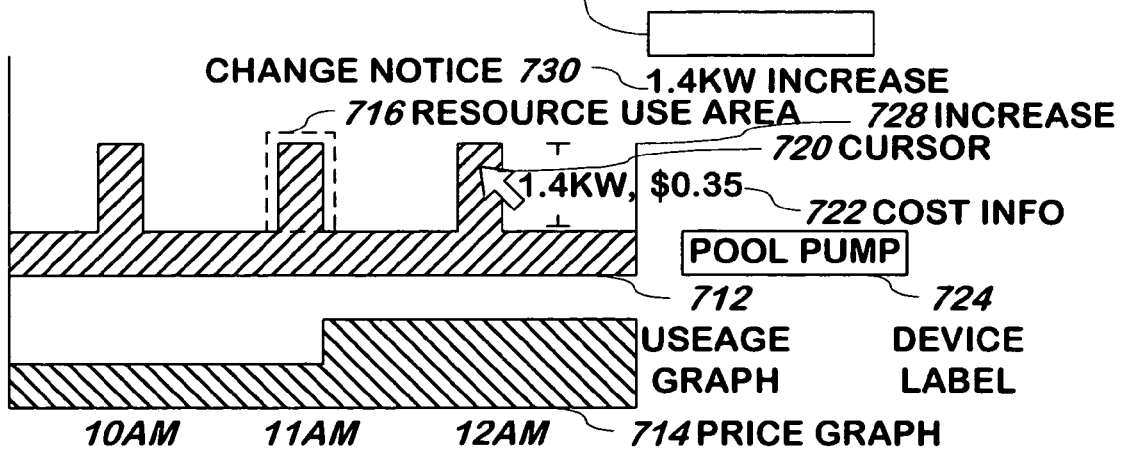
FIG. 7 is a pictorial representation of a display screen according to one embodiment of the present invention.

Usage data for other resources, such as water or gas may be received and used as described in more detail with respect to FIG. 7.

Resource use is analyzed 220 based on the identifier of each device, by comparing the resource use to normal resource use for the environment reported and/or based on usage reports received in a similar fashion for other users or by identifying potential savings that can be achieved by changing the operation or environment of similar devices. For example, the power use of a refrigerator may be compared with actual resource use for the same type of device or similar devices of other nearby users (optionally, around the same date and time) to identify that the power usage of a refrigerator is eight times the average for the area, which may indicate that a replacement could save resources such as power. The power usage of the refrigerator may be compared with estimated power usage of refrigerators currently available for sale to determine if resource savings may be identified. The power use of a second refrigerator can be identified as one that could be eliminated. In one embodiment, when a user identifies each device as described above, the user may select from preselected names, such as "second refrigerator" or "garage refrigerator" to facilitate such analysis.

Suggestions are provided 222 to the user or to a third party such as a retailer to reduce resource use based on the analysis of the different devices, where resource use savings can be identified. The third party such as a retailer may then contact the user, for example, by mail or by e-mail or at the next time the user logs into the server to provide information about products or services that may be provided to reduce resource use, for example a more energy efficient refrigerator, or a service that cleans the coils on a refrigerator. Suggestions may include alternatives for a device, such as a pool cover to reduce the use of a pool pump. Suggestions may include suggestions regarding the operating environment of a device, such as suggesting checking for blockage of attic vents when an air conditioning unit is running several hours after the outside temperature has dropped lower than the desired indoor temperature.

The user may log out or the server may time out for lack of activity, and an indication that the user is no longer using the system may be provided to the meter 224 to allow it to reduce its reporting rate as described herein.

The user may implement the suggestions or the third party may work with the user to implement the suggestions 226 and the user may repeat operation of the method starting with step 212.

Figure 3:
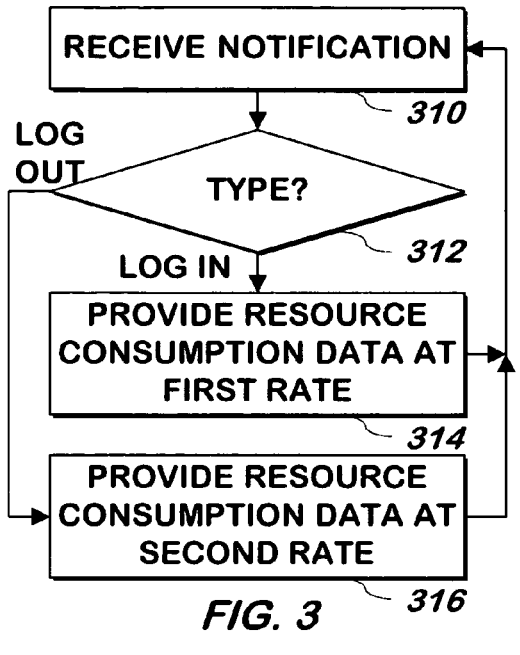
FIG. 3 is a flowchart illustrating a method of providing resource usage data from a meter according to one embodiment of the present invention.

Referring now to FIG. 3 a method of changing a data transmission rate of an electric meter or other resource meter is shown according to one embodiment of the present invention. A notification of a log in or log out or other activities may be received 310. If the indication is a log in or other indication corresponding to a need for a high data rate 312, the data rate is set to a first rate 314, and if the indication is a log out or other indication that does not correspond to a need for a high data rate 312, the data rate of the meter is reduced to a second rate, lower than the first rate 316. Data may be reported at a rate of once every 1 second to once every 2 minutes at the first rate, and once every 15 minutes at the second rate. Conventional run length compression or other compression may be employed (or may be employed only at the slower rate) to only provide data corresponding to the time, direction and magnitude of changes over a threshold percent or amount, such as 5% or 0.1 KwH.

Steps 410-418 illustrate the change in transmission of pulse count information from a resource meter that provides pulses to indicate a quantity of the resource has been consumed. The date and time of pulses received is recorded. At the end of each reporting period, the number of pulses, or the number of pulses and duration between them is sent based on whether the number of pulses exceeds a threshold rate. This allows less data to be reported if the pulse rate is low.

Figure 5:
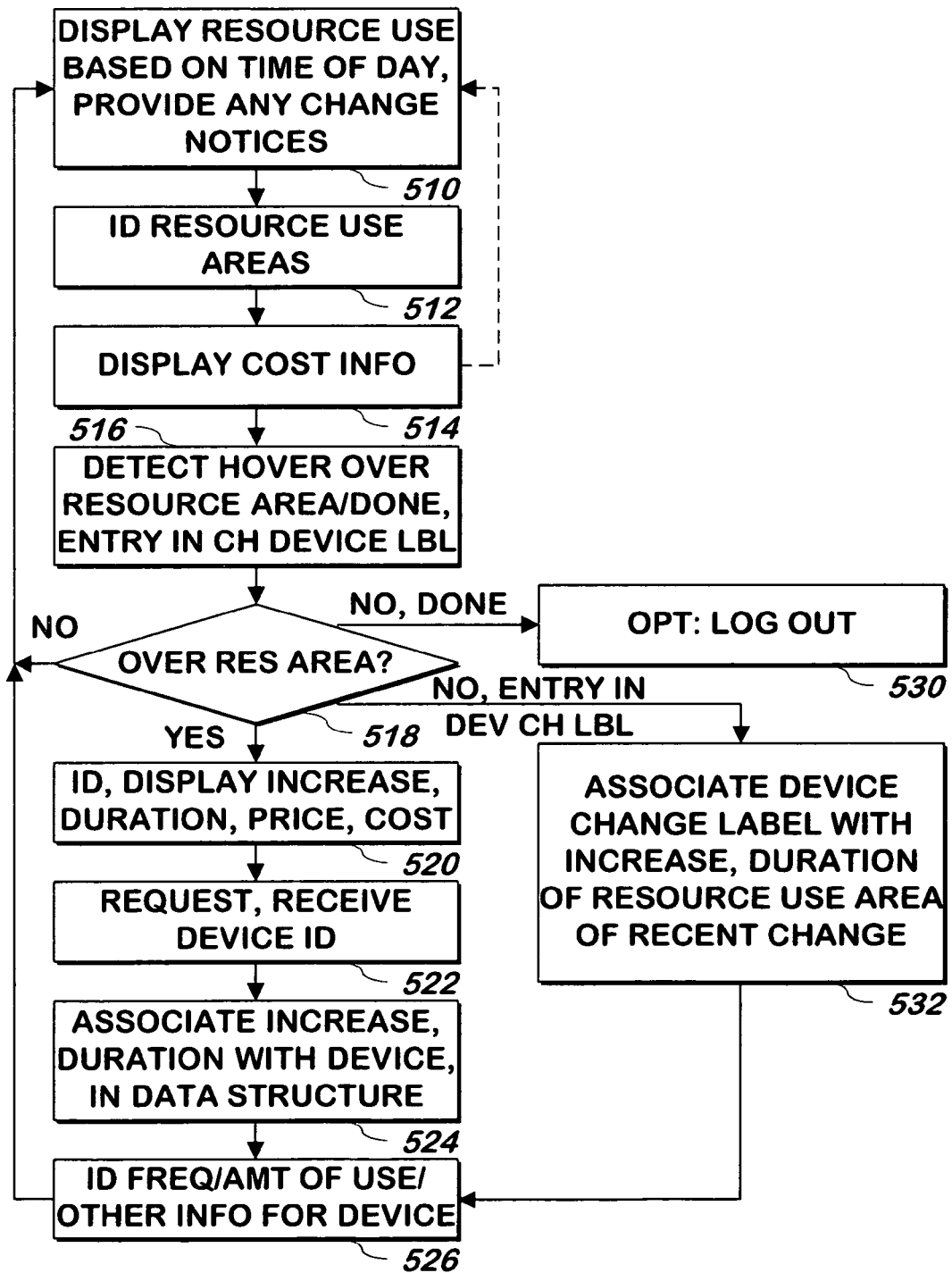
FIG. 5 is a flowchart illustrating a method of analyzing resource usage according to one embodiment of the present invention.

Referring now to FIG. 5, a method of assigning identifiers of devices to power consumed is shown according to one embodiment of the present invention. The resource use from a meter such as an electric meter is displayed 510, for example, by sending it from a server to a user's computer system over a network in graphical form. In one embodiment, the form is a chart showing the rate of use of the resource plotted against the time of day, for a recent period such as a few minutes to a few hours. In one embodiment, a user interface control is provided to allow the user to zoom in or out of the graph, thereby changing the amount of time displayed.

One or more resource use areas are identified 512 from the graph. A resource use area corresponds to the resource being used by a single device or multiple devices, as will now be described.

Referring momentarily to FIG. 7, a representative graph 712 is shown. This graph illustrates a base level rate of usage of the resource, in this case electricity, with three resource areas, such as resource area 716 that indicates a device turned on and off. In one embodiment, a resource use area of the graph is identified by an area that slopes rapidly up, plateaus for some period, then slopes rapidly down. In one embodiment, the resource use areas identified are those for which amount of the increase on the up slope is approximately equal to the amount of decrease on the down slope, though in other embodiments, other shapes, such as stairsteps or other more complex shapes may be identified as resource use areas that correspond to two devices turning on in succession, and turning off in any order.

The resource use shown in FIG. 7 may correspond to a refrigerator or pool pump, for example, as such devices can cycle on and off throughout the day. In identifying resource use areas, known resource use may be recorded as if it were manually assigned and subtracted from the resource use indicated by the graph. For example, the resource use reported by a smart refrigerator or smart thermostat may be subtracted from those shown on the graph before resource use areas are identified to remove the effect of such known devices from the graph to remove potential sources of confusion. In one embodiment, the known resource uses are also subtracted from the graph to eliminate potential confusion by the user. In either embodiment, the resource use areas of the graph will correspond to the resource use indicated by other devices, and if the resource use of known devices is displayed on the graph, the resource use areas are considered to be above the graphical display indicating the resource use of any known devices.

Referring now to FIGS. 5 and 7, cost information may also be displayed 514 on the graph. In one embodiment, the cost is cost per unit of the resource, such as the cost per kilowatt hour, corresponding to the time of day and day, received in step 210 of FIG. 2 as described above. Price graph 714 shows one embodiment of cost data being displayed with the resource usage data.

In one embodiment, steps 510-514 operate as a continuously running process, which automatically updates in real time or nearly real time (without further user input) based on the data from the meter, and the cost at the time of day for that day.

A determination is made 516 as to whether the user is hovering a mouse cursor 720 over a resource use area of the graph or is otherwise indicating a resource use area, for example, by surrounding it by clicking and holding the mouse button down while the mouse cursor is at one corner of an area the user is defining, and then dragging the mouse to the opposite corner of a box defined by such action that will include the intended resource use area. The user hovers a mouse cursor if the mouse cursor does not move or does not substantially move for a threshold period of time.

If the user hovers over a resource use area 518, the increase in the rate of use of the resource, and the duration of that use is identified and the cost of that use, the product of the increase, the duration, and the cost at that time for that day, are identified and the increase and cost is displayed 520. On FIG. 7, such information is shown as cost information 722, though other information may be displayed. Instead of using the increase, the minimum or the maximum of the increase and the decrease may be used instead to cancel out effects of other devices that may turn on or off at the same time based on the approximate shape of the portion of the graph at or around the resource use area.

An identifier of the device corresponding to the resource use area over which the user hovered the mouse cursor is requested from the user and received 522, and the identifier is associated 524 with information about the resource use area, which may include the date and time of day, an indication of the increase in the rate of resource use that corresponds to that device, an indication of the duration of such use, an indication of the cost and an identifier of the user or collector or meter. In one embodiment, associating an identifier of the device with such information may include adding the identifier to a data structure in a computer readable medium such as memory or disk storage that already has such information, or vice versa. Such association may be made by removing or reordering identifiers of other possible devices that may be in the data structure to leave the identifier of the device in place, or by marking such identifier in a list of identifiers already associated with the information. In such a way, the data structure, existing in a tangible, physical media, is transformed. The data structure is, of course, readable by a computer system, and used for the applied purpose of resource use analysis as described herein. In one embodiment, the data structure need not be a single data structure, but may be a set of related data structures, such as different tables in a relational database.

In FIG. 7, the device identifier is provided in device label area 724, and received from that area.

In one embodiment, the transformation of the data structure occurs on a server computer system, or a client computer system, each coupled via a network.

In one embodiment, as increases or decreases above a threshold percentage (e.g. 5%) in the rate of resources used appears on the display, as part of step 510, a change notice is provided that identifies the magnitude of the most recent change. FIG. 7 illustrates a large increase 728 being displayed, for example, as the next cycle of the device corresponding to resource use area 716 appears. Change notice 730 is displayed along with change device label 732 that allows the user to identify the device corresponding to the resource use area to which the increase corresponds. Step 516 also includes detecting if the user has entered such a change device label, and if so 518, the device change label is associated with the information corresponding to the resource use area to which the increase or decrease corresponds 532, in a manner similar or identical to that described with respect to step 524, and the method continues at step 526.

Frequency of use of the device may be identified 526. In one embodiment, step 526 includes attempting to identify other resource use areas that have similar increases, and durations that are at least consistent with the duration of the resource use area identified, and associating them with the device name after confirming with the user. In one embodiment, outside temperatures and/or the name of the device may be used to make such a determination. For example, an other resource use area that has the same increase, but a longer duration may be identified as the air conditioning unit the user just identified if the outside temperature at the time and date corresponding to the resource use area identified is hotter than the outside temperature at the other resource use area. In one embodiment, to confirm that the other resource use areas correspond to the same device, the other resource use areas identified are highlighted and the user is asked to confirm that they are correct. The user may click on any highlighted resource use area to remove it from consideration. The user may then confirm that the highlighted resource use areas correspond to the same device, and the frequency of use is identified for the device. In one embodiment, other information may be identified that allows an estimate of the cost or resource use over a longer period of time instead of frequency of use, such as typical use in an hour, typical use in an hour as a function of outside or inside temperature, etc. In one embodiment, the user may click on all of the identified resource use areas of the graph, thereby removing all of them, and manually enter frequency of use, duration, functions, times of use, or other information that can be used to calculate the amount of resource use or cost of resource use of a device. In one embodiment, if no other resource use areas are automatically identified as described above, the user is prompted to enter such information, and such information is received and stored as part of the data structure as described above, all as part of step 526. The method continues at step 510.

As the method iterates to step 512, known device assignments may be removed from either the graph or from a modified set of data based on the graph that is used to identify resource use areas, to allow resource use areas corresponding to unknown devices to be identified more easily. Device assignments may be known because they have been identified by the user as described herein or reported by a device that reports its resource use.

If the user does not hover over a resource use area and none of the other conditions exist (entry in the device change label or indication that the user is done as described herein) 518, the method continues at step 510. If the user indicates they are done with making the device assignments to resource use areas 518, the user may be logged out 530 as described above.

System.

Figure 6:
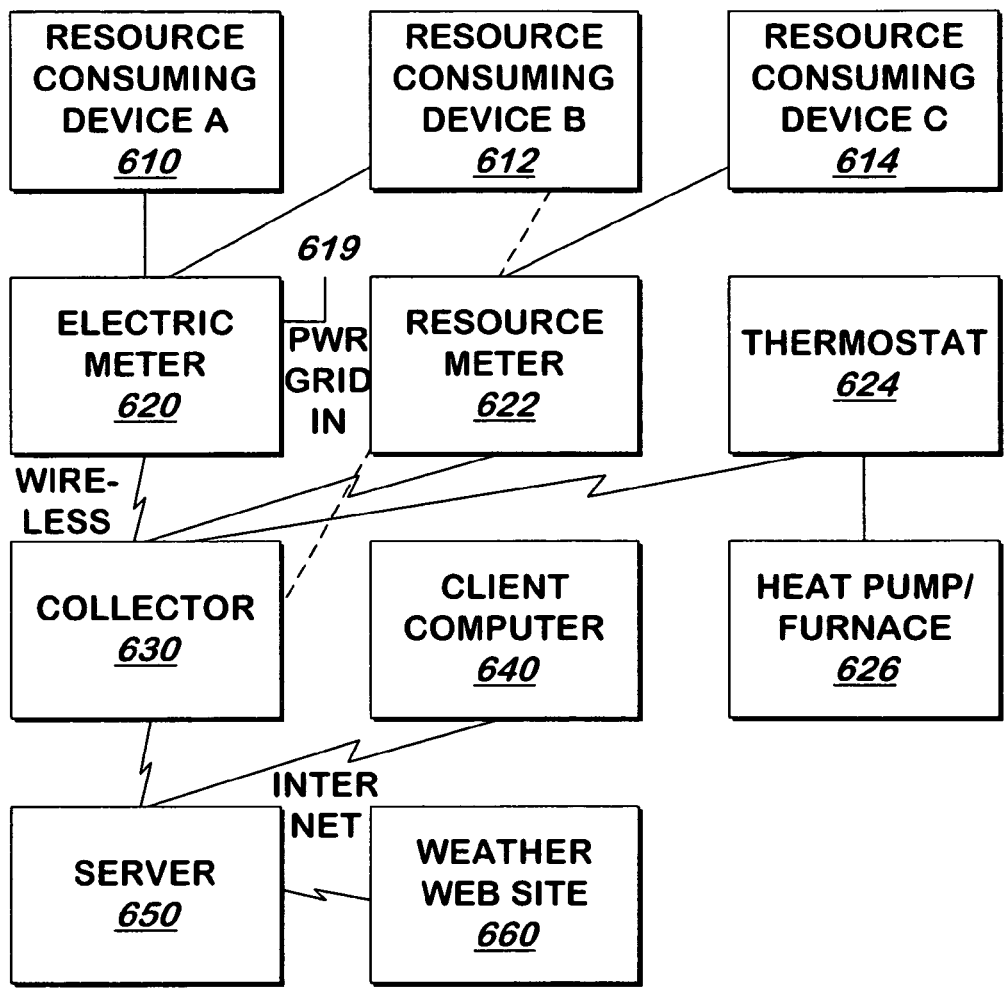
FIG. 6 is a block schematic diagram of a system for analyzing power usage according to one embodiment of the present invention.

Referring now to FIG. 6, a system for identifying resource use of various devices is shown according to one embodiment of the present invention. Three resource consuming devices 610-614 are shown, along with a heat pump/furnace 626, though there may be any number of resource consuming devices. Resource consuming devices A and B 610-612 use electricity and are thus electrically coupled to electric meter 620, which may include a conventional smart electric meter, capable of reporting as described herein via a ZIGBEE wireless network or another wireless network such as a conventional wireless mesh network.

Resource consuming device C 614 may employ a different resource, such as water or gas, and is thus connected to resource meter 622 which may be a smart meter, also ZIGBEE capable, wireless capable or wireless mesh network capable.

Meters 620, 622 report rates of resource use as described herein to collector 630, which forwards such rates to server 650 via a network such as the Internet. Meters may report rates of resource use to server 650 directly or one 622 may report via the other 620, bypassing collector 630, though in such case, some meters may serve as the collectors for other meters. Meters may also implement the method of FIGS. 3 and/or 4.

Figure 4:
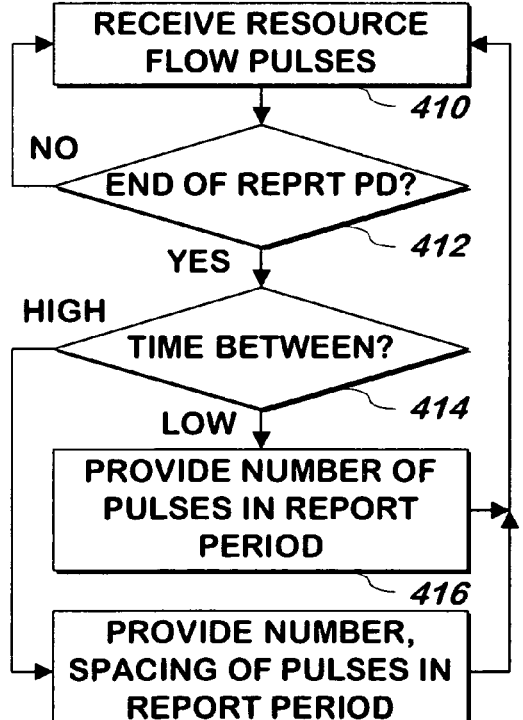
FIG. 4 is a flowchart illustrating a method of providing resource usage data from a meter according to one embodiment of the present invention.

Collector 630 includes a ZIGBEE (or other wireless network or wireless mesh network) capable, Internet capable device that receives reports from meters 620, 622 and forwards them to server 650 with a unique identifier of collector 630 or meters 620, 622 that has been associated with the user on the server, for example via the registration information described above or via a system administrator. Collector 630 may implement the methods of FIG. 3 or 4.

In one embodiment, resource consuming device B 612 may be a smart device, meaning it reports its resource use, for example via a ZIGBEE wireless network connection, other wireless network connection or other wireless mesh network connection. In one embodiment, the report is made to collector 630, though in another embodiment, such report may be made to electric meter 620 which forwards it to collector 630 or server 650.

In one embodiment, server 650 is a conventional server coupled to the Internet that performs the method of FIGS. 2 and 5. Data may be provided for display via a web interface or ADOBE FLASH user interface that is provided by server 650 to client computer 640 via the Internet. Client computer 640 may be a conventional personal computer coupled to the Internet, running a conventional browser and optionally running FLASH, a cell phone, an IPHONE commercially available from APPLE, INC. or a touch screen photo display or any other similar device, and is used by the user to view and provide the data as described above. Server 650 may obtain weather information as described above from weather web site 660, which may include a conventional weather database providing weather conditions and temperatures by zip code and time of day.

In one embodiment, client computer 640 serves the function of server 650 as well. In another embodiment, client computer 640 is ZIGBEE capable, wireless capable or wireless mesh network capable and also serves the function of collector 630. Electric meter 620 may serve the function of collector 630. In one embodiment, each user may have their own client computer system 640, devices 610-614, electric or other resource meter 620-622, thermostat and heat pump/furnace 624-626 and collector 630, though collector 630 may be shared by multiple users. There may be any number of users with similar or identical components 610-640 whose resource use information is collected by server 650. Server 650 may include one or more conventional web servers and may include a conventional database.

Figure 8:
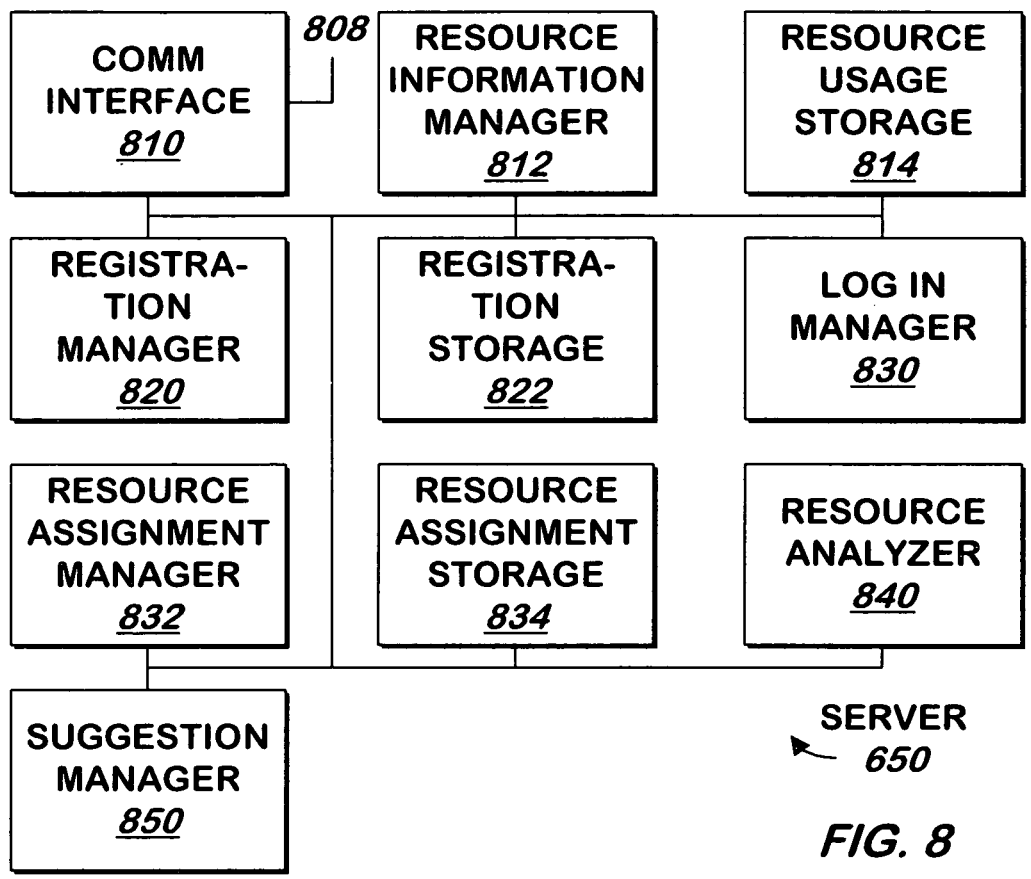
FIG. 8 is a block schematic diagram illustrating the server of FIG. 6 in more detail according to one embodiment of the present invention.

FIG. 8 is a block schematic diagram illustrating server 650 of FIG. 6 in more detail according to one embodiment of the present invention. Referring now to FIG. 8, communication interface 810 includes a conventional TCP/IP compatible communication interface, such as an Ethernet interface running suitable communication protocols. All communication into or out of server 650 is made via communication interface 810 coupled to a conventional network such as the Internet, via input/output 808.

Resource information manager 812 receives resource usage information, for example from collector 630 of FIG. 6 and stores it into resource usage storage 814, associated with the date and time of receipt and the identifier of the building to which it pertains, such as a unique device identifier of collector 630 or meters 620-622 that is received with the resource use information. In one embodiment, such identifier is passed with all such information or information based thereon as described herein. Resource information manager 812 may also periodically receive other information, for example, temperatures from weather web site 660 that allows determination regarding expected use of the resource as described above, and stores such information with the date and time into resource usage storage 814, along with information pertaining to the other information, for example the zip code to which the temperature pertains. Resource information manager 812 may request such information as part of the process of receiving it.

Registration manager 820 provides a user interface to prompt for registration information, including the user's address of the user's residence or business, the device identifier of collector 630 that collects resource usage information for the user's residence or business (or identifiers of meters 620-622), the cost or costs of the resource and days and times such cost is applicable if the cost of the resource varies by time and/or day, from the user and/or system administrator as described above and stores such registration information into registration storage 822 associated with the user or users for which it applies. In one embodiment, registration manager 820 associates the unique device identifier of collector 630 or meters 620-622 with the user's address in registration storage 822, which may include a conventional address database. Log in manager 830 provides a user interface to allow the user to log in and uses the registration information in registration storage 822 to authenticate the user.

Once the user is logged in, log in manager 830 provides the user identifier of the user to resource assignment manager 832, which then signals the collector 630 for that user that the data rate should be increased as described above and collector 630 complies. Resource assignment manager 832 provides information to the user's client computer system 640 that may be used to display in real time or near real time resource usage information corresponding to that user from resource usage storage 814 as described above, and makes assignments of device labels to resource use area information by transforming data structures in resource assignment storage 834 that also includes the identifier of the collector 630, a user identifier, device identifier of collector 630 as described above and in more detail below. The information in resource assignment storage 834 may include the user identifier or device identifier, the label that identifies the device that used the resource, and the resource use information that identifies the amount of the use of the resource by that device during a period, such as annually.

When the user signals resource assignment manager 832 that the user wishes to perform an analysis, resource assignment manager 832 provides the user identifier or identifier of the collector 630 associated with that user in registration storage 822 to resource analyzer 840, which uses the information in any or all of resource assignment storage 834, resource usage storage 814 and registration storage 822 corresponding to the identifier it receives to perform the analysis described above and provides indications of potential areas for improvement to suggestion manager 850, which makes suggestions to the user or provides information that may be used by a third party such as a retailer to make suggestions as described above. The information used for the analysis may include the assignment information, weather or other information, and the assignment information made to devices with the same device identifier or made to other devices by users having nearby addresses as indicated by the address database, around the same date and time as described above. Resource assignment manager 832 may also signal the collector 630 or meter 620-622 associated with the user as described above to reduce the data rate as described above.

For example, resource analyzer 840 may use the user identifier to retrieve the identifier of the collector 630 in registration storage 822, and then use the identifier of the collector or the user to retrieve the device assignments in resource assignment storage 834, along with information associated with the device assignments. Resource analyzer 840 may then compare the device assignments with an average of device assignments made by other users within a 5 mile radius within 15 days of the user's assignment (or on days or at times in with similar outside and/or inside temperatures) for the same device identifier, such as "pool pump". To identify the device assignments within such radius, resource analyzer 840 may identify in registration storage 822 all users who identified their addresses as being within 5 miles of the address of the user whose resource use is being analyzed, based on the map database stored in registration storage 822 or using a web based map database accessed via communication interface 810. Device assignments may be normalized to similar length periods for the purpose of this analysis, so that if one user's assignments only are made for a 15 minute period, the resource use of each device may be multiplied by four to provide an hourly resource use. Resource uses of days or weeks may also be employed. If the user whose resource use is outside a boundary condition (e.g. two standard deviations above the average for all such users within a five mile radius who made device assignments at times with the same approximate temperature), the device identifier, resource use of that user, and average and standard deviation of the resource use of other users for the same named device may be supplied by resource analyzer 840 as an indication of a potential areas for improvement. The process may be repeated for each identified device. Other means of identifying norms, such as a usage database for each device identifier, may also be employed.

It is noted that other information other than the amount of resources may be employed to perform the analysis and such information may be supplied by resource analyzer 840 as well. For example, the fact that the pool pump "on" cycles are twice as long as average "on" cycle times in the area may be analyzed as abnormal by resource analyzer and supplied to suggestion manager 850, and suggestion manager 850 may use this information to suggest that the pool pump filter be investigated for blockage.

Figure 9:
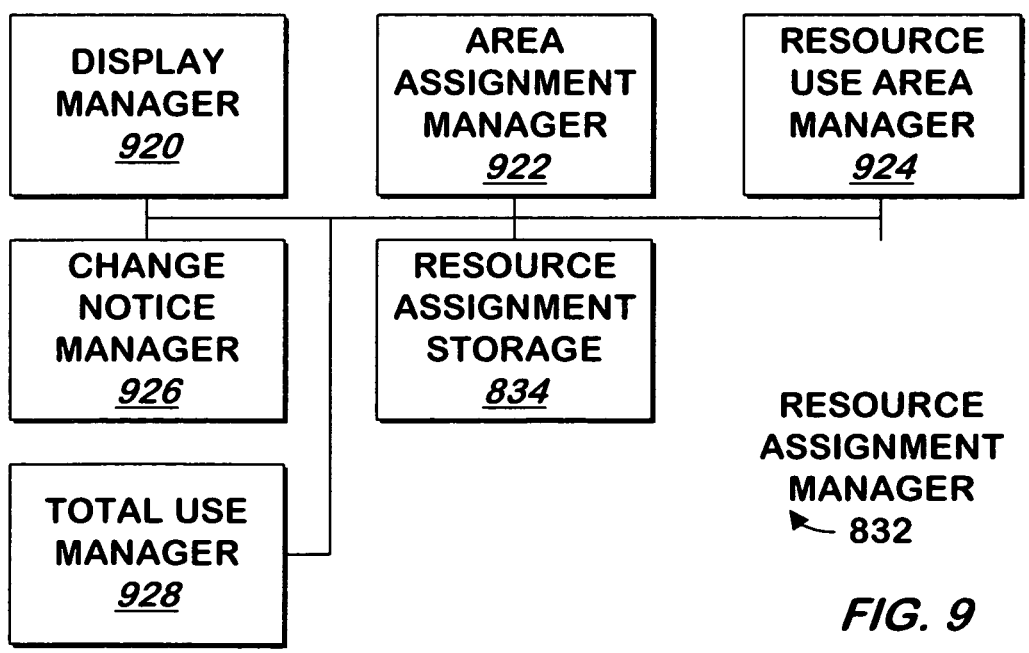
FIG. 9 is a block schematic diagram illustrating the resource assignment manager of FIG. 8 in more detail according to one embodiment of the present invention.

FIG. 9 is a block schematic diagram illustrating the resource assignment manager 832 of FIG. 8 in more detail according to one embodiment of the present invention. Referring now to FIG. 9, display manager 920 provides the resource usage data for the user (including amount of use of the resource and identifier of the collector) from resource usage storage 814 and other information such as cost information that may be received by registration manager 820 and stored in registration storage 822 to the user's client computer system 640. Area assignment manager 922 scans the data in resource usage storage 814 assigns a unique identifier to, and identifies, the resource use areas that can be clicked on as described above using a coordinate system in common with that used by display manager 920 and provides the coordinates of such area and the identifier to the client computer system 640 as well as storing it into a data structure in resource assignment storage 834. Coordinates may include the date and time of day of the beginning (and optionally the end) of the area. Area assignment manager 922 also stores into the data structure the corresponding resource use information such as amount of increase, duration and the like. Resource use area manager 924 receives device label assignments and the identifier of the resource use area to which the assignment corresponds from the client computer system 640 and the resource use area identifier (which may be the date and time and collector identifier) to which each device assignment corresponds, and stores such label assignments into the data structure for that client and that resource use area in resource assignment storage 834. Change notice manager 926 receives from client-computer system 640 label assignments and an indication that they correspond to the change notice, and change notice manager 926 adds the label to the corresponding data structure for that client, such as the newest one, which may be marked and created by area assignment manager 922 as soon as an increase is detected (with the resource use information to be added later when the corresponding decrease is detected).

Each time such an assignment of a label is made to the data structure, resource use area manager 924 or change notice manager 926 provides an identifier of the user and the data structure corresponding to the assignment to total use manager 928, which identifies potential other resource use areas that may correspond to the newly labeled one as described above and provides identifiers to client computer system 640, which provides the user interface to the user as described above or otherwise asks the user for information on frequency of use or other information that can be used, for example, to identify the total amount and/or cost of resources used by that device over a longer period of time, such as a month or a year, and stores such information into the corresponding data structure.

It is noted that as resource use areas move along the display, area assignment manager 922 updates the area assignments to client computer system 640 and in the data structures.

Figure 10:
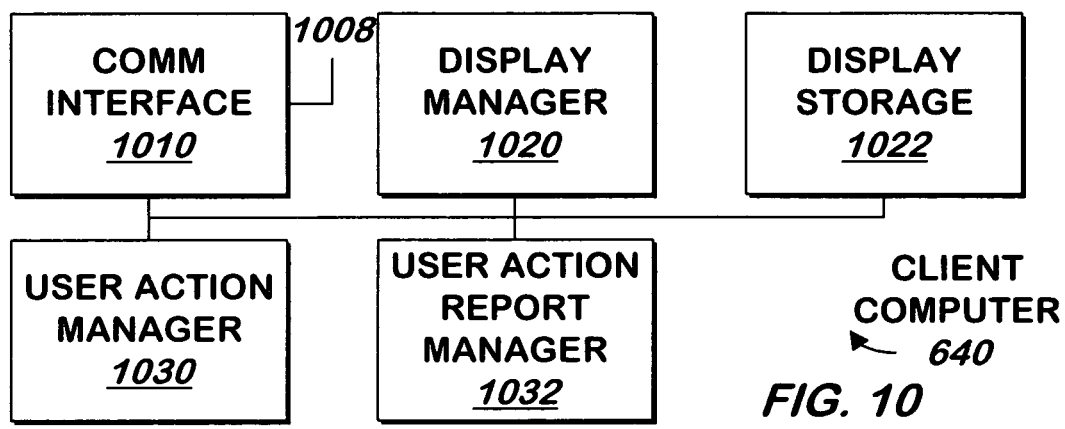
FIG. 10 is a block schematic diagram illustrating the client computer system of FIG. 6 in more detail according to one embodiment of the present invention.

FIG. 10 is a block schematic diagram illustrating the client computer system 640 of FIG. 6 in more detail according to one embodiment of the present invention. Referring now to FIG. 10, communication interface 1010 includes a conventional TCP/IP compatible communication interface such as an Ethernet interface running suitable conventional communication protocols, and may contain a ZIGBEE-compatible (or wireless-compatible or wireless mesh compatible) communication interface running suitable communication protocols and may contain a conventional keyboard/mouse/monitor interface coupled to a conventional keyboard, mouse and monitor. All communication into or out of client computer system 640 may be made via communication interface via input/output 1008, which may be connected to a network, such as the Internet.

Display manager 1020 receives the information as described above and renders the appropriate information as graphics and provides the rendered graphics to the display (not shown). Other information such as coordinates and area identifiers are stored into display storage 1022 by display manager 1020. User action manager 1030 receives user commands and actions such as hovers, and signals display manager 1020 with sufficient information to allow display manager 1020 to display the response to such user action as described above, which display manager 1020 does. Information to be displayed in response to a hover or change notices and the like is identified by area assignment manager 922 and provided to display manager 1020, which stores it into display storage 1022 and uses it to display the appropriate response to a user action. User action manager 1030 provides an indication of the user action as well as any data associated therewith to user action report manager 1032, which provides it to the server 650 of FIG. 6 via the network. Log in manager 830 has associated in resource assignment storage 834 the user's IP address with the user at log in, or may employ cookies or the like at log in and associate an identifier in the cookie with the user in resource assignment storage 834 to allow the server to identify the user when information is received from the client computer system 640.

Figure 11:
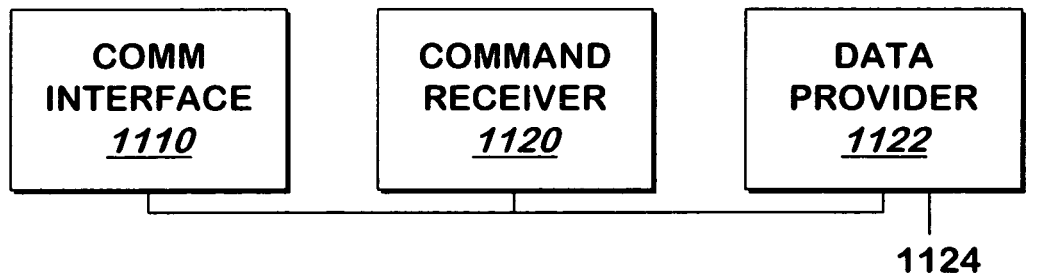
FIG. 11 is a block schematic diagram illustrating the reporting apparatus of the meters or collector of FIG. 6 in more detail according to one embodiment of the present invention.

FIG. 11 is a block schematic diagram illustrating the reporting apparatus of the meters 620-622 or collector 630 of FIG. 6 in more detail according to one embodiment of the present invention. Referring now to FIG. 11, communication interface 1110 includes a conventional ZIGBEE, wireless, wireless mesh or TCP/IP-compatible communication interface or any of these. Command receiver 1120 receives via communication interface 1110 commands to increase or decrease the data rate as described above and signals data provider to increase or decrease the data rate as described above. Data provider 1122 receives data from meters via communication interface 1110 or receives from the conventional portion of a meter via input 1124 the resource use rate and provides the data as described above. In one embodiment, data provider 1122 may provide the data as described above with respect to FIG. 4.

What is claimed is:
1. A method of identifying resource use, comprising:
periodically receiving use of the resource from a meter, wherein the meter measures resource use for a metered location;
graphically displaying to a user the resource use received from the meter over time;
identifying to the user, by a processor, at least one resource use area of the graph of the resource use over time that indicates use of a resource by at least one device responsive to at least one steep slope of the graph, wherein the at least one device is at the metered location;

receiving from the user an identifier of at least one of the at least one device of the metered location that caused the resource to be used in the manner corresponding to at least one of the at least one resource use area;

identifying, by a processor, exceptional use of the resource responsive to the identifier of the at least one of the at least one device and the use of the resource; and providing information regarding correcting the exceptional use.

2. The method of claim 1, additionally comprising:
receiving information about the price of the resource; and
identifying the cost of the resource use area to the user.

3. The method of claim 1, wherein the information regarding correcting the exceptional use is provided directly to the user.

4. The method of claim 1, wherein the information regarding correcting the exceptional use is provided to a party other than the user.

5. The method of claim 4:
wherein the party other than the user is a retailer; and
the retailer contacts the user regarding reducing the resource use responsive to the information regarding correcting the exceptional use.

6. The method of claim 1:
additionally comprising receiving information regarding known use of the resource by at least one other device, other than the at least one device; and
wherein the exceptional use is identified additionally responsive to the known use of the resource by the at least one other device.

7. The method of claim 1:
additionally comprising receiving information regarding weather; and
wherein the exceptional use is identified additionally responsive to the weather information received.

8. A computer system for identifying resource use, the computer system comprising:
at least one memory; and
a processor configured to execute:
a resource information manager having an input coupled to a meter that measures use of a resource by multiple devices at a metered location, the resource information manager for periodically receiving a quantity of use of the resource from the meter, adding date and time of use to the quantity of use, and providing a plurality of said quantities of use of the resource and date and time at an output;
a display manager having an input coupled to the resource information manager output for receiving the plurality of quantities of use of the resource and date and time, the display manager for providing at an output information used for graphically displaying to a user the resource use received from the meter over time;
an area assignment manager having an input coupled to the display manager output for receiving the information used for graphically displaying to the user the resource use received from the meter over time, the area assignment manager for identifying to the user at an output at least one resource use area of the graph of the resource use over time that indicates use of a resource by at least one device at the metered location responsive to at least one steep slope of the graph;
a resource use area manager having an input for receiving from the user an identifier of at least one of the at least one device at the metered location that caused the resource to be used in the manner corresponding to at least one of the at least one resource use area, the resource use area manager for providing the identifier at an output;
a resource analyzer having an input coupled to the resource use area manager output for receiving the identifier and to the resource information manager output for receiving the plurality of quantities of use of the resource and date and time, the resource analyzer for identifying at an output information regarding exceptional use of the resource responsive to the identifier of the at least one of the at least one device and the use of the resource; and
a suggestion manager having an input coupled to the resource analyzer output for receiving the information regarding exceptional use of the resource, and for providing at an output information regarding correcting the exceptional use.

9. The computer system of claim 8, wherein: the area assignment manager input is additionally for receiving information about the price of the resource, the resource information manager for providing the information about the price of the resource at an output; and the area assignment manager is additionally for identifying to the user at the output the cost of the resource use area to the user.

10. The computer system of claim 8, wherein the information regarding correcting the exceptional use is provided directly to the user.

11. The computer system of claim 8, wherein the information regarding correcting the exceptional use is provided to a party other than the user.

12. The computer system of claim 11:
wherein the party other than the user is a retailer; and
the retailer contacts the user regarding reducing the resource use responsive to the information regarding correcting the exceptional use.

13. The computer system of claim 8 wherein:
the resource analyzer input is additionally for receiving information regarding known use of the resource by at least one other device, other than the at least one device; and
the resource analyzer identifies the exceptional use additionally responsive to the known use of the resource by the at least one other device.

14. The computer system of claim 8:
additionally comprising receiving information regarding weather; and
the exceptional use is identified additionally responsive to the weather information received.

15. A computer program product comprising a non-transitory computer readable medium having computer readable program code embodied therein for identifying resource use, the computer program product comprising computer readable program code devices configured to cause a computer system to:
periodically receive use of the resource from a meter, wherein the meter measures resource use for a metered location;
graphically display to a user the resource use received from the meter over time;
identify to the user at least one resource use area of the graph of the resource use over time that indicates use of a resource by at least one device at the metered location responsive to at least one steep slope of the graph;
receive from the user an identifier of at least one of the at least one device at the metered location that caused the resource to be used in the manner corresponding to at least one of the at least one resource use area;

identify exceptional use of the resource responsive to the identifier of the at least one of the at least one device and the use of the resource; and provide information regarding correcting the exceptional use.

16. The computer program product of claim 15, additionally comprising computer readable program code devices configured to cause the computer system to: receive information about the price of the resource; and identify the cost of the resource use area to the user.

17. The computer program product of claim 15, wherein the information regarding correcting the exceptional use is provided directly to the user.

18. The computer program product of claim 15, wherein the information regarding correcting the exceptional use is provided to a party other than the user.

19. The computer program product of claim 18:

wherein the party other than the user is a retailer; and the retailer contacts the user regarding reducing the resource use responsive to the information regarding correcting the exceptional use.

20. The computer program product of claim 15:

additionally comprising computer readable program code devices configured to cause the computer system to receive information regarding known use of the resource by at least one other device, other than the at least one device; and wherein the exceptional use is identified additionally responsive to the known use of the resource by the at least one other device.

21. The computer program product of claim 15:

additionally comprising computer readable program code devices configured to cause the computer system to receive information regarding weather; and wherein the exceptional use is identified additionally responsive to the weather Information received.

* * * * *

UNITED STATES PATENT AND TRADEMARK OFFICE
CERTIFICATE OF CORRECTION

PATENT NO. : 9,542,658 B2  
APPLICATION NO. : 12/590451  
DATED : January 10, 2017  
INVENTOR(S) : Gary Grossman et al.

Page 1 of 1

It is certified that error appears in the above-identified patent and that said Letters Patent is hereby corrected as shown below:

On the Title Page

(56) References Cited:

Please delete "Naiad, Carlos, SCE Programmable Communicating Thermostat (PCT), Demand Response and Energy Efficiency 2006 Emerging Technologies Summit, Long Beach, California, Oct. 26, 2006" and insert --Haiad, Carlos, SCE Programmable Communicating Thermostat (PCT), Demand Response and Energy Efficiency 2006 Emerging Technologies Summit, Long Beach, California, Oct. 26, 2006--.

Signed and Sealed this  
Second Day of May, 2017

Michelle K. Lee  
*Director of the United States Patent and Trademark Office*